C. I. LOTT.
ROLLER BEARING FOR RAILWAY CARS, &c.
APPLICATION FILED JUNE 1, 1917. RENEWED JULY 10, 1919.
1,326,754.
Patented Dec. 30, 1919.
2 SHEETS—SHEET 1.
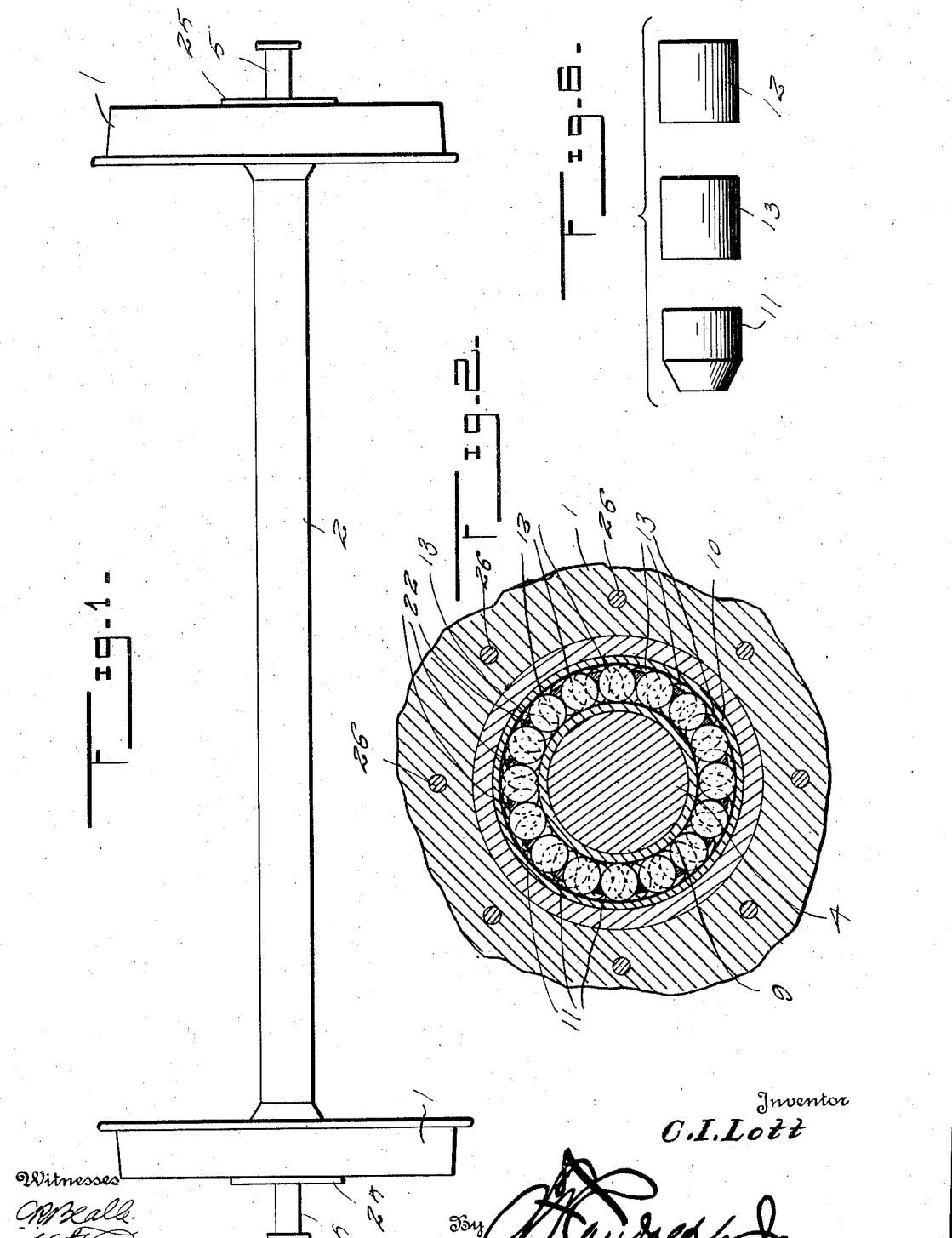

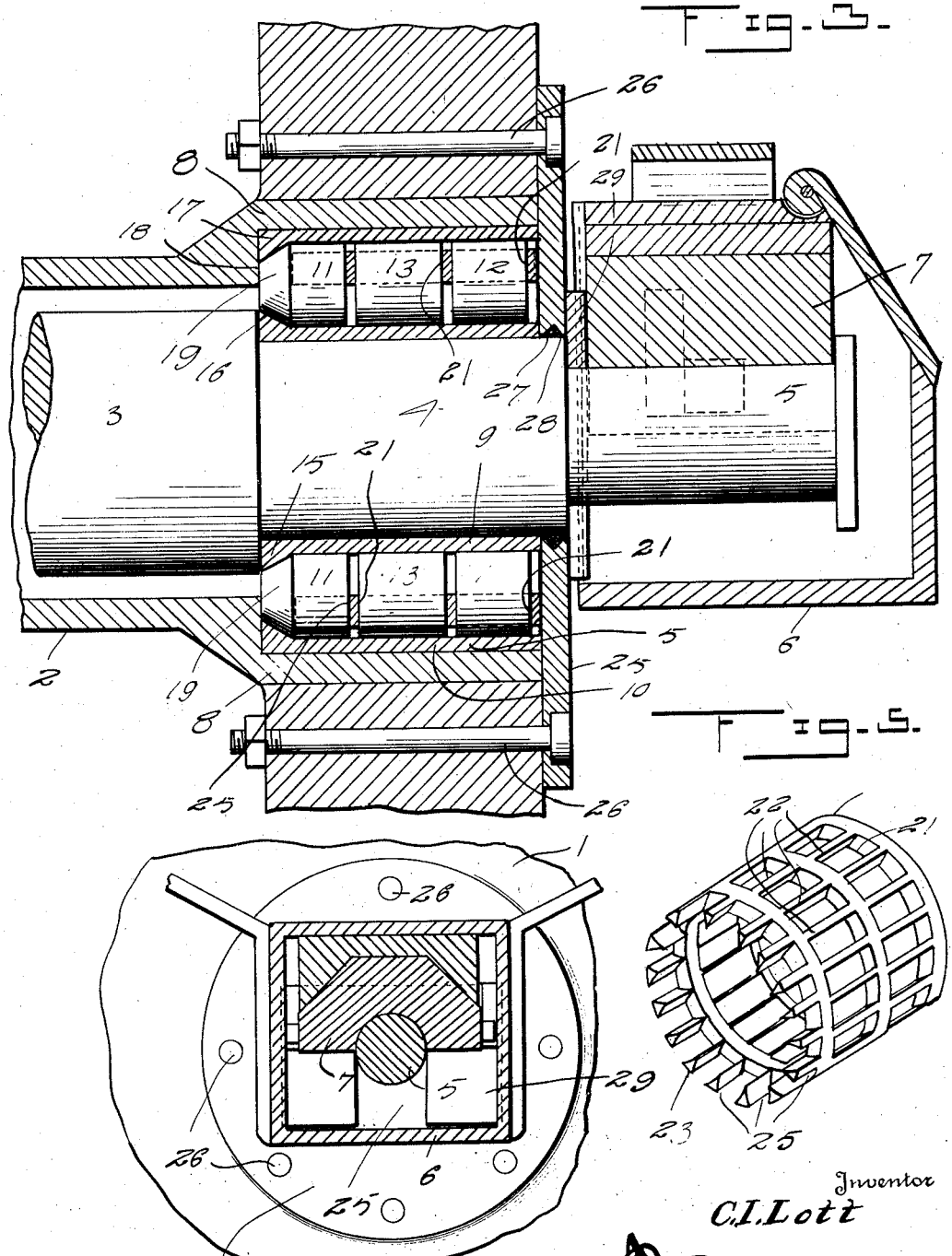

UNITED STATES PATENT OFFICE.

CHARLES I. LOTT, OF PEARSON, GEORGIA.

ROLLER-BEARING FOR RAILWAY-CARS, &c.

1,326,754.  Specification of Letters Patent. Patented Dec. 30, 1919.

Application filed June 1, 1917, Serial No. 172,254. Renewed July 10, 1919. Serial No. 309,970.

*To all whom it may concern:*

Be it known that I, CHARLES I. LOTT, a citizen of the United States, residing at Pearson, in the county of Coffee and State of Georgia, have invented certain new and useful Improvements in Roller-Bearings for Railway-Cars, &c.; and I do hereby declare the following to be a full, clear, and exact description of the invention, such as will enable others skilled in the art to which it appertains to make and use the same.

The invention relates to a roller bearing for railway cars, automobiles and the like.

The object of the present invention is to improve the construction of roller bearings and to provide a simple, practical and efficient roller bearing of strong, durable and comparatively inexpensive construction adapted to be readily employed on railway cars, street cars and the like where the wheels are held to a gage, and capable of being also advantageously employed on automobiles and various other vehicles and adapted to reduce the friction to a minimum and relieve the wheel and the axle entirely of wear so that the wheel and axle will last indefinitely. A further object of the invention is to provide a roller bearing of this character in which the rollers and other parts subjected to wear will be readily accessible and adapted to be easily replaced or renewed.

It is also an object of the invention to provide a structure adapted for use in connection with the ordinary equipment and which, in event of an accident to the roller bearing while a car is *en route*, will enable the car wheels to turn on the journals of the axle in the ordinary manner and without interfering with the usual operation of such car axles in the journal boxes.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawings:

Figure 1 is a side elevation of car axle and car wheels held to gage by a connecting casing and provided with roller bearings constructed in accordance with this invention.

Fig. 2 is a transverse sectional view taken through the journal box.

Fig. 3 is a sectional view taken longitudinally of the axle.

Fig. 4 is a sectional view through the journal box.

Fig. 5 is a detail perspective view of the cage or frame for spacing the rollers.

Fig. 6 is a detail view, illustrating the construction of the rollers.

Like numerals of reference designate corresponding parts in the several figures of the drawings.

In the accompanying drawings, in which is illustrated the preferred embodiment of the invention, 1—1 designate car wheels pressed on and held to gage by a tubular casing 2 which receives a car axle 3 having inner and outer journal portions 4 and 5 formed by successive reductions of the axle and arranged respectively within the outer portions of the casing 2 and journal boxes 6. The journal boxes 6 are of the ordinary construction and are equipped with the usual journal brass 7 which is arranged upon the outer journal portion 5 of the axle.

The casing 2 has its outer portion 8 enlarged to form housings for roller bearings each of which comprises inner and outer bushings 9 and 10, inner, outer and intermediate rollers 11, 12 and 13 and an annular frame or cage 14 which is adapted to maintain the several sets of rollers in their relative positions. The sets of rollers are arranged in staggered relation and by providing three separate sets of rollers the number of points of support for the axle is materially increased and the rollers are divided and the friction reduced, and the liability of the locking of the rollers effectually prevented. The inner bushing 9 has an enlarged inner portion 15 fitting against the shoulder 16 of the axle and tapered longitudinally thereof to present an inclined or beveled inner face to the inner set of rollers 11, and the outer bushing is provided with a reversely arranged enlargement 17 fitting against a shoulder 18 of the terminal portion of the tubular casing 2 and presenting an inclined inner face. The inclined or beveled faces of the enlargements 15 and 17 receive and fit against the inner ends 19 of the rollers 11, and the said inner ends 19 are beveled or tapered and arranged to take up and resist the end thrust incident to the tendency of the wheels to move along the axle. The annular frame or cage 14 is provided with openings 21 and 22 and it has recesses or openings 23 formed by projecting portions 24 located at the inner end of the frame or cage and receiving the inner set of rollers. The outer and intermediate sets of rollers are located in the openings 21 and 22 and the outer peripheral portions of the rollers project beyond the annular frame and fit against the outer bushing while the inner peripheral portions of the rollers fit against the inner bushing.

The enlargement of the casing 2 is closed by an outer side plate 25 secured by bolts 26 to the car wheel, as clearly shown in Fig. 3 of the drawings, and provided at its center with an opening to receive the axle and having a groove 27 in the wall of the opening to receive a gasket or packing 28 for retaining a lubricant in the roller bearing. The casing 2 is spaced from the axle to provide an intervening lubricant receiving space and the rollers are adapted to be readily supplied with a lubricant which is retained in the casing 2 and the terminal enlargements thereof. The dust guard or plate 29 of the journal box fits against the side plate of the wheel.

The roller bearing is adapted to be applied to car wheels of street and steam railways and various other conveyances without discarding the usual equipment or necessitating any material alteration in the same and the axle may be turned down and shaped to receive the inner bushing, it being of course necessary to provide the enlarged terminal portions or housings of the casing 2 for the reception of the outer bushing and the rollers. The bushings are adapted to be readily removed when worn and they receive the wear of the rollers and the wear of the parts is not transmitted to either the wheel or the axle which will last indefinitely.

What is claimed is:

1. The combination with an axle, a casing receiving the axle, and a wheel mounted on the casing, of inner and outer bushings, said bushings being provided with thickened or enlarged inner portions presenting inclined or beveled inner faces, inner and outer and intermediate sets of rollers interposed between the bushings, the inner set of rollers having tapered ends to fit the beveled faces of the bushings, and an annular frame or cage having openings receiving the bushings and arranged in staggered relation to cause the rollers to contact with the bushings at different points circumferentially of the bushings.

2. The combination with an axle, a casing receiving the axle, and a wheel mounted on the casing, of inner and outer bushings, said bushings being provided with thickened or enlarged inner portions presenting inclined or beveled inner faces, inner and outer and intermediate sets of rollers interposed between the bushings, the inner set of rollers having tapered ends to fit the beveled faces of the bushings, and an annular frame or cage provided with staggered openings to receive the intermediate and outer rollers and having projecting portions forming openings or recesses receiving the inner rollers, said projecting portions terminating at the tapered portions of the said inner rollers.

In testimony whereof I affix my signature in the presence of a witness.

CHAS. I. LOTT.

Witness:
BENNETT S. JONES.